C. P. CLÉMENT.
AUTOMATIC FIREARM.
APPLICATION FILED NOV. 13, 1909.
976,122.
Patented Nov. 15, 1910.
2 SHEETS—SHEET 1.
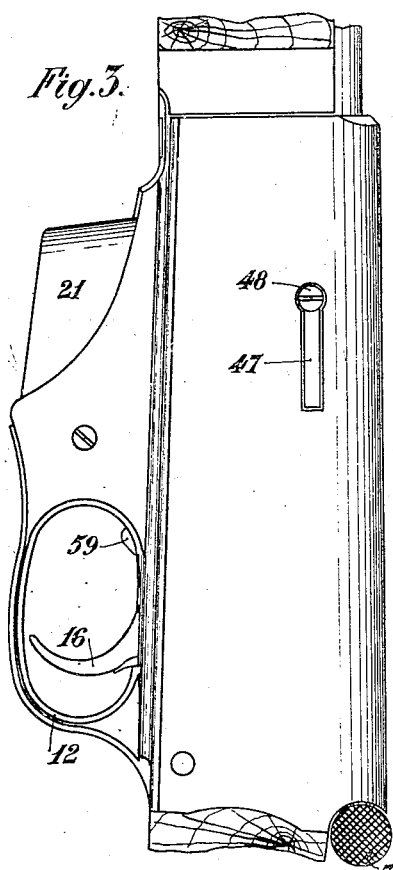
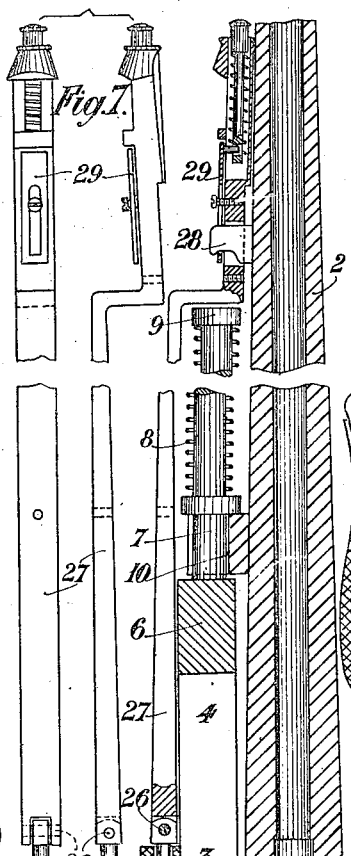
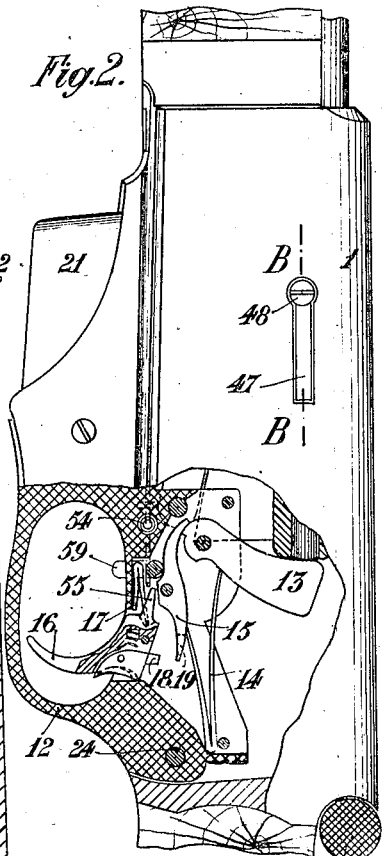
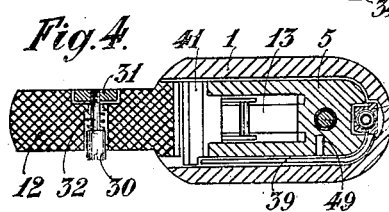
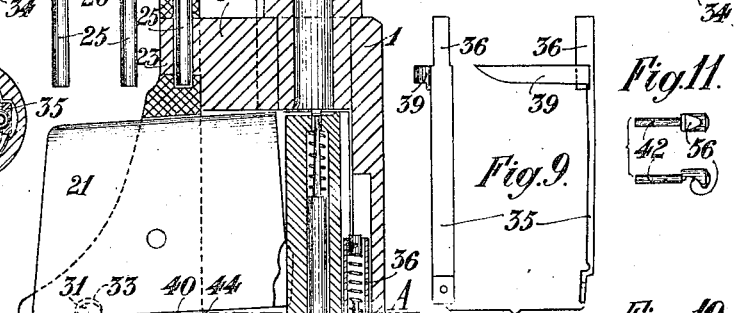
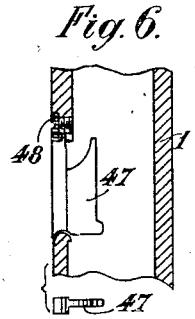
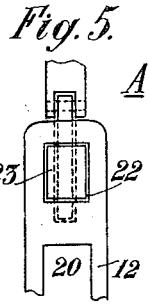
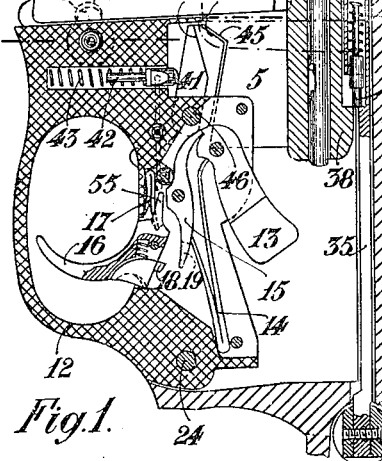
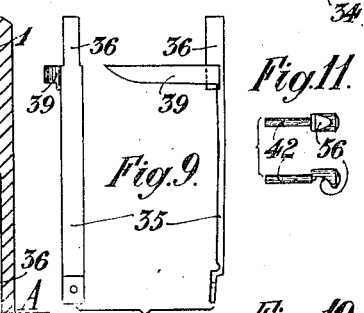
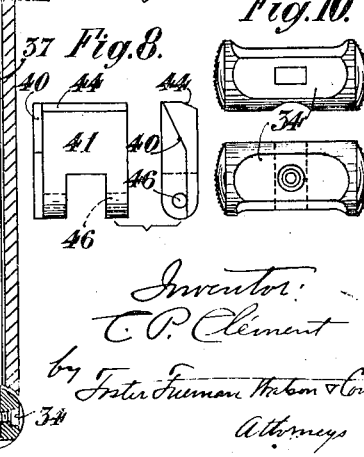

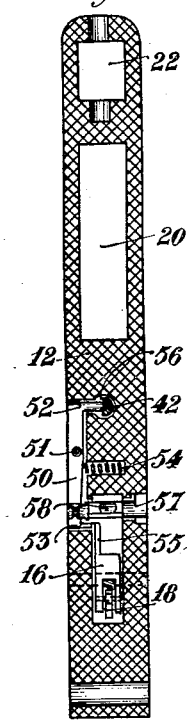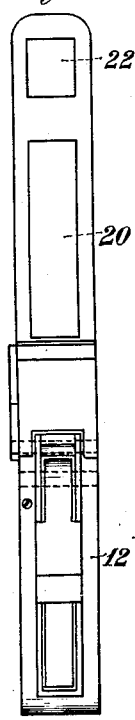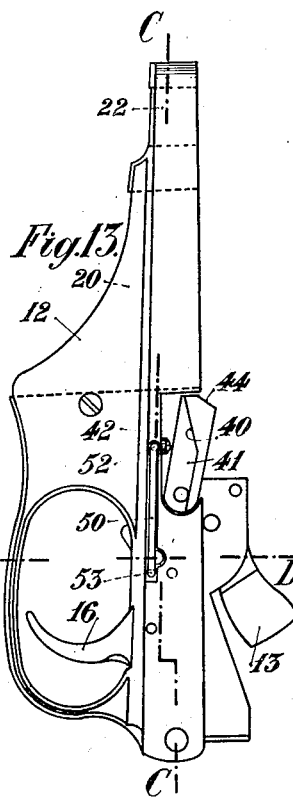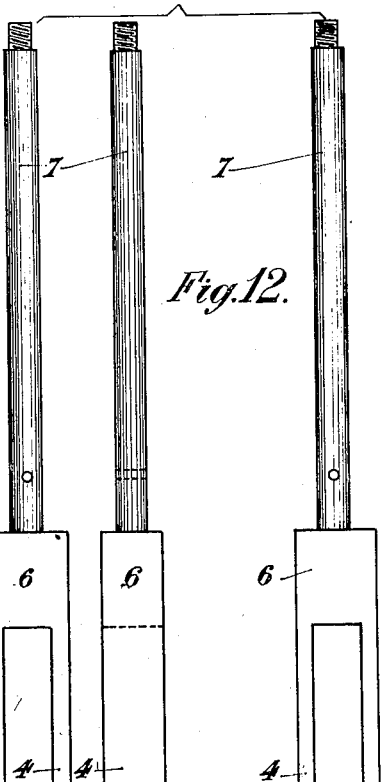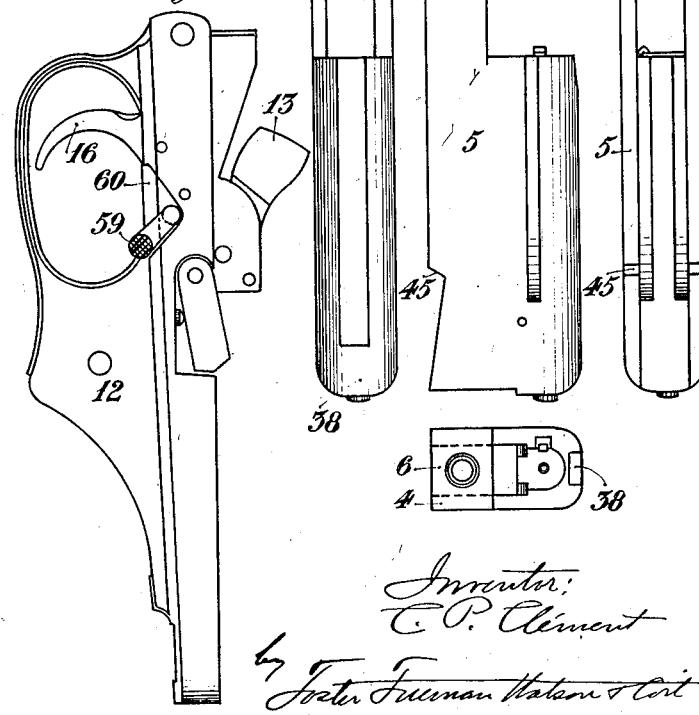

UNITED STATES PATENT OFFICE.

CHARLES PHILIBERT CLÉMENT, OF LIEGE, BELGIUM.

AUTOMATIC FIREARM.

976,122.  Specification of Letters Patent.  Patented Nov. 15, 1910.

Application filed November 13, 1909. Serial No. 527,897.

*To all whom it may concern:*

Be it known that I, CHARLES PHILIBERT CLÉMENT, gun-maker, subject of the King of Belgium, residing at Liege, Belgium, have invented certain new and useful Improvements in Automatic Firearms; and I do hereby declare the following to be a full, clear, and exact description of the invention, such as will enable others skilled in the art to which it appertains to make and use the same.

The present invention relates to an automatic fire-arm in which simple but effective means are provided for temporarily locking or retarding the breech-bolt and maintaining the breech closed during the firing of the cartridge, said bolt being however, disengaged and released under the effect of the recoil, so as to allow of being thrown rearward for extracting and ejecting the empty cartridge shell cocking the hammer, and introducing a new cartridge into the barrel.

The annexed drawing represents by way of example, the improved mechanism as applied to a rifle.

Figure 1 is a longitudinal section, showing the arm closed, cocked, and with the safety device in operation. Fig. 2 is a corresponding part section showing the position of the parts after firing. Fig. 3 is an exterior view. Fig. 4 is a transverse section on A—A Fig. 1. Fig. 5 is a plan of the fore part of the trigger guard. Fig. 6 represents a part horizontal section on B—B Fig. 2. Fig. 7 shows in elevation and plan, the longitudinal fore-end member. Fig. 8 is a similar view of the bolt locking or retarding member. Fig. 9 shows the bar employed for drawing-back the bolt by hand. Fig. 10 illustrates the finger-hold or operating device connected to the said bar, and which the shooter actuates when drawing-back the bolt. Fig. 11 shows separately the plunger member engaging with the locking element. Fig. 12 represents, an elevation topside plan, underside plan, and end view, of the breech bolt carrying the firing pin. Fig. 13 is a view of the left hand side of the trigger guard carrying the lock mechanism and trigger, same being shown placed in safety. Fig. 14 is a right-hand side view of said guard and lock mechanism. Fig. 15 represents a plan of same, and Fig. 16 is a horizontal section on line C—C Fig. 13. Fig. 17 shows a vertical section on line D—D Fig. 13.

The arm comprises a breech-casing 1, open at the bottom and to the fore part of which is attached the barrel 2. Between its two side walls the casing 1 is provided at the front with a block 3 embraced by the two lateral wings or sides 4 of the breech-bolt 5, which fits closely against the inside walls of the breech casing 1. These wings or sides 4 of the bolt 5 are connected together at the forward end by the solid cross-piece 6, carrying a rod 7 surrounded by the re-action spring 8, which bears at one end on the head 9 of this rod, and at the other end against an abutment 10 carried by the barrel 2. The tendency of the spring 8 is thus to force the bolt 5 forward into its breech-closing position.

The lock mechanism is entirely carried by the base plate or body part of the trigger guard 12; it comprises the hammer 13, the hammer spring 14, the sear 15, the trigger 16, and its spring 17. The disconnection between the sear 15 and the trigger 16 is effected by a small lever 18, pivoting upon the trigger, and whose nose engages within a gap or recess 19 in the sear 15 when the trigger is fully pressed, with the object of preventing the successive and untimely discharge of several shots. The base plate of the trigger-guard 12 is fixed, at the rear end, by a pin 24 carried by the breech casing 1; it is provided at the forward end with two slots; the one 20 serving to receive the magazine 21, while the other 22 is engaged by a projection 23 of the block 3 of the breech-casing. A pin 25, jointed at 26 to the fore-end iron 27, carrying the wood of the fore-end, passes transversely through the part 23 and the forward portion of the base plate of the trigger guard, so as to fix the latter in position. Toward the front the fore-end iron 27, which follows the shape of the sides 4 and the rod 7 of the breech-bolt 5, is connected with a lug 28 depending from the barrel 2 by means of a sliding spring actuated plate 29 having therein a slot through which the lug 28 extends. The bolt 5, whose sides are supported by their lower edges upon the trigger guard 12, is thus at the same time retained in place in the breech casing 1.

The fastening for the magazine 21 consists of a pin 30 passing transversely through the trigger guard 12 and provided with a stop 31 which is caused to engage by a spring 32, with a corresponding recess 33 formed in the magazine 21. The bolt 5 is connected to a transverse external grip or finger-hold 34 situated at the rear of the casing 1, by a rod 35 located within the interior of said casing, and inclosing at the fore end a spring 36 whose plunger 37 bears upon a projecting part 38 of the bolt 5, so as to establish a yielding spring connection between the latter and the member 35. This said bar or member 35 carries upon one side a depending arm 39 which corresponds in form to the side of the bolt 5 and whose lower end comes immediately over the inclined face 40 of a block 41 which is pivoted about an axis 46 carried by the base plate of the trigger guard 12. This block 41 is pressed upward by a headed pin or plunger 42 upon which acts a spring 43; the block 41, whose front edge is inclined or chamfered, is thus caused to engage within recesses 45 formed in the lower edge of the sides of the bolt 5. The first shock due to the recoil produced by the firing of a cartridge is transmitted first of all through the inclined faces 44 and 45, to the round notches made in the trigger-guard base plate within which the rear edge of the block 41 accurately fits in order to prevent breakage or bending of the pin 46. This action has a temporarily retarding effect upon the bolt such as to maintain the breech closed during the actual firing of the cartridge, but the intensity of the shock is sufficient to cause the face 45 to slide over the face 44, which forces the block 41 downward and depresses the spring 43. The breech bolt 5 thus liberated, is thrown rearward by the recoil until the cross-piece 6 strikes the solid block 3 at the same time as the rear face abuts against the end of the breech casing 1.

In order to cock the arm for firing the first shot, it is necessary to first disengage the connection 44—45. The drawing back of the grip part 34 by the shooter with this object causes first the compression of the spring 36 and takes the arm 39 of the bar 35 into contact with the inclined face 40 of the locking block 41; this has the effect of disengaging the front edge 44 from the notch 45 in the sides of the bolt 5. It is only then that the plunger 37 of the spring 36 engaging with the projecting part 38 of the bolt 5, rigidly connects the bar 35 to the latter, and the drawing-out of the finger-hold 34 takes the bolt 5 rearward, compressing the reaction spring 8.

The ejector preferably consists of a separate member 47 (Figs. 2, 3 and 6), located in an opening in one of the side walls of the breech casing 1, and fixed by means of a screw 48. This member 47 projects into the interior of said casing 1, and engages within a groove 49 (Fig. 4) formed longitudinally in the corresponding face of the bolt 5. This member 47 causes, in the known manner, the ejection of the cartridge shell through an opening made in the opposite face of the casing 1.

In order to prevent firing taking place—that is to say, the releasing of the hammer 13—before the complete closing of the arm, a special mechanism is provided for immovably locking the trigger 16. This mechanism consists (Figs. 1, 2 and 16) of a lever 50 pivoting horizontally in the trigger guard 41, and provided with two arms 52 and 53 directed inward. The front arm 52 is pressed by a spring 54 against the inclined face 56 of the head of the pin 42 (Fig. 11), while the rear arm 53 comes opposite to the face of a prolongation 55 of the trigger 16. The arrangement is such that when the locking or retarding member 41 and the headed pin 42 are lowered—that is to say, when the bolt 5 is not locked—the arm 52 of the lever 50 is forced outward, and the arm 53 is taken below the prolongation 55 of the trigger. This latter is thus held immovable. When the trigger is held depressed and the bolt 5 has not reached the end of its forward movement, the arm 53 similarly passes above the prolongation 55.

The safety acts upon the sear 15; it is arranged so as to be easily accessible and to serve as an indicator—that is to say, to enable the shooter to readily see whether the hammer 13 is cocked or not. It consists of a notched or flattened pin 57 (Figs. 1, 2, 13, 14, 16 and 17) arranged horizontally in the trigger guard 12, and whose solid part or boss 58 bears on the sear 15 when the operating lever 59 is moved toward the front (position of Figs. 1 and 14) and thus prevents the nose of said sear being taken out of bent with the hammer 13. The free end of the safety lever 59 moves in a recess 60, so as to fit against the side walls of the casing 1 when the trigger guard 12 is put in place. When the arm is put out of safety, the lever 59 is moved rearward, into the position opposite to that shown in Figs. 1 and 14. When, on the contrary, the hammer 13 is released and taken out of bent, and the lever 59 is moved from the rear to the forward position, the boss 58 bears upon the slightly lowered sear 15 so that the safety is arrested in the vertical position shown in Fig. 2; one then knows that the hammer 13 is not cocked.

The disassembling of the arm is very simply effected by detaching the fore-end iron 27 and removing the pin 25 from the projecting part 23 of the breech-casing 1. The trigger guard 12 can then pivot about the axis 24, which renders the mechanism completely accessible, and permits of removing the bolt without taking same to pieces. If the axis 24 is also withdrawn, the trigger-guard 12 can be completely removed.

It is obvious that the rifle represented and described above can be modified in its details and that its mechanism is applicable to arms of other types.

Having fully described my invention, what I desire to claim and secure by Letters Patent is:—

1. In an automatic fire arm, the combination of a reciprocating breech bolt having formed thereon a beveled or inclined surface, a pivotally mounted check device adapted to coöperate with said beveled surface to retard rearward movement of the breech bolt, and a slide for manually moving the bolt rearward and having means supplemental to its connection with the bolt for positively rocking said check device out of the path of the bolt.

2. In an automatic fire arm, the combination of a reciprocating breech bolt having formed thereon a beveled or inclined surface, a pivotally mounted check device having a cam surface adapted to coöperate with said beveled surface to retard rearward movement of the breech bolt and having at one side a second cam surface, 40, and a manually operable slide connected with the bolt to move it rearward and provided with means for coöperating with said cam surface 40 to move the check out of the path of the bolt before it is engaged thereby.

3. An automatic fire-arm comprising in combination the breech bolt a pivoted member provided with an inclined face which engages with corresponding faces on the bolt so as to create a resistance to the movement of the latter at the moment of firing a sliding member connected with the bolt for withdrawing the latter by hand, and an arm carried by said sliding member adapted to engage with an inclined surface on the pivoted locking member, and connected to the bolt through the medium of a spring so as to allow of said locking member being depressed and disengaged from the bolt prior to the drawing back of the latter.

4. In an automatic fire arm, the combination of a reciprocating breech bolt having a projection terminating in a beveled or inclined surface, a pivotally mounted device having a cam surface adapted to coöperate with said beveled surface to retard rearward movement of the breech bolt, and a spring pressed plunger or pin having one end bearing against the pivotally mounted device and acting to hold the cam surface thereon in operative position.

5. In an automatic fire arm, the combination of a reciprocating breech bolt, means acting to lock the bolt in its forward position, a firing mechanism including a movable trigger, and a lever interposed between the bolt locking means and the trigger and adapted to be actuated by said means to prevent operation of the trigger when said means are disengaged from the bolt.

6. An automatic fire-arm comprising in combination with the breech-bolt, a pivoted member provided with an inclined face on the bolt so as to create a resistance to the latter at the moment of firing, a spring actuated plunger acting upon the pivoted member so as to tend to maintain the latter in engagement with the bolt, an inclined face on the head of the plunger and a locking lever of which one end bears against said inclined face of the plunger while the other end engages, when the pivoted block is depressed, with the trigger.

7. An automatic fire-arm comprising in combination with the breech bolt a pivoted member provided with an inclined face which engages with a corresponding face on the bolt so as to create a resistance to the latter at the moment of firing, a pair of forwardly extending side wings carried by the bolt which slide by their lower edges upon the base plate of the trigger guard, a rigid abutment carried by the breech casing which is embraced by said side wings, a solid cross-piece connecting together the forward ends of said wings and a forwardly-extending rod carried by the said cross-piece, and surrounded by the reaction spring arranged so as to force the bolt forwardly.

8. An automatic fire-arm comprising in combination with the breech bolt, a pivoted block provided with an inclined face which engages with a corresponding face on the bolt so as to create a resistance to the movement of the latter at the moment of firing, and a trigger guard whose base plate carries the whole of the lock mechanism, said trigger guard being fixed in position at the rear by means of a pin, and at the front by a jointed pin, carried by the fore-end and passing longitudinally through a section of the base plate of the trigger-guard and also through a portion of the breech casing.

9. An automatic fire-arm comprising in combination with the breech bolt, a pivoted block provided with an inclined face which engages with a corresponding face on the bolt so as to create a resistance to the latter at the moment of firing and a trigger guard whose base plate carries the whole of the lock mechanism, said trigger guard being fixed in position at the rear by a pin and at the front by a hinged pin, passing through a section of the base plate and also through a portion of the breech casing, and carried by the inner extremity of the fore-end iron whose forward end is attached to the barrel by a sliding catch.

10. An automatic fire-arm comprising in combination with the breech bolt, a pivoted block provided with an inclined face coöperating with the bolt so as to create a resistance to the movement of the latter at the moment of firing, a trigger guard whose base plate carries the whole of the lock mechanism, a fore-end iron carrying a hinged pin at the rear end which passes longitudinally through a section of said trigger guard base plate and also through a portion of the breech casing, and a sliding spring catch for attaching the forward extremity of said fore-end iron to the barrel.

11. An automatic fire-arm comprising in combination with the breech-bolt, a pivoted block provided with an inclined face which engages with a corresponding face on the bolt so as to create a resistance to the movement of the latter at the moment of firing, a trigger guard whose base plate carries the whole of the lock mechanism and which is fixed at its rear end by a pin about which it can turn, a fore end iron carrying a hinged pin at the rear end which passes through a section of said trigger guard base plate and also through a portion of the breech casing and an ejector comprising a separate member located within one of the side walls of said breech casing and fixed by a screw.

12. In an automatic fire arm, the combination with a breech casing, barrel, breech bolt, and firing mechanism, including a trigger, of a plate closing an opening in the bottom of the breech casing, and means supported by said plate adapted to retard rearward movement of the breech bolt.

13. In an automatic fire arm, the combination with a breech casing, barrel, breech bolt, and firing mechanism, including a trigger, of a plate closing an opening in the bottom of the breech casing, and constituting a guard for the trigger, and means supported by said plate and acting to lock the breech bolt in its forward position.

14. In an automatic fire arm, the combination of a breech casing open at its lower end, a barrel, a plate secured to the breech casing and extending across the opening therein, a reciprocating breech bolt, firing mechanism, the bolt and firing mechanism being both supported by said plate, and means carried by said plate for retarding rearward movement of the breech bolt.

15. In an automatic fire arm, the combination of a breech casing open at its lower end, a barrel, a plate pivotally connected at its rear end with the breech casing and supporting a breech bolt and coöperating mechanism, and a removable connection between the forward end of said plate and the breech casing.

In testimony whereof I affix my signature in presence of two witnesses.

CHARLES PHILIBERT CLÉMENT.

Witnesses:
H. ABERT JOHNSON,
A. PENDLETON CRUGER.